United States Patent [19]
Shibuya

[11] Patent Number: 4,777,398
[45] Date of Patent: Oct. 11, 1988

[54] PIEZOELECTRIC MOTOR

[75] Inventor: Tsuyoshi Shibuya, Tokyo, Japan

[73] Assignee: Tokyo Juki Industrial Co., Ltd., Tokyo, Japan

[21] Appl. No.: 47,675

[22] Filed: May 8, 1987

Related U.S. Application Data

[63] Continuation-in-part of Ser. No. 770,669, Aug. 29, 1985, abandoned.

[30] Foreign Application Priority Data

Aug. 31, 1984 [JP] Japan ................................ 59-182181

[51] Int. Cl.⁴ ............................................. H01L 41/08
[52] U.S. Cl. ...................................... 310/328; 310/317
[58] Field of Search .................. 310/26, 317, 323, 328

[56] References Cited

U.S. PATENT DOCUMENTS

| | | | |
|---|---|---|---|
| 3,377,489 | 4/1968 | Brisbane | 310/328 |
| 3,902,084 | 8/1975 | May, Jr. | 310/328 |
| 3,902,085 | 8/1975 | Bizzigotti | 310/328 |
| 4,219,755 | 8/1980 | O'Neill | 310/328 |
| 4,435,666 | 3/1984 | Fukui et al. | 310/328 |
| 4,468,583 | 8/1984 | Mori | 310/328 |
| 4,518,887 | 5/1985 | Yano et al. | 310/328 |
| 4,547,086 | 10/1985 | Matsumoto et al. | 310/328 X |
| 4,570,095 | 2/1986 | Uchikawa | 310/328 |
| 4,570,096 | 2/1986 | Hara et al. | 310/328 |
| 4,600,854 | 7/1986 | Bednorz et al. | 310/328 X |
| 4,622,483 | 11/1986 | Staufenberg, Jr. et al. | 310/328 |
| 4,647,808 | 3/1987 | Shibuya | 310/328 |
| 4,651,046 | 3/1987 | Ohya et al. | 310/328 |

FOREIGN PATENT DOCUMENTS

| | | | |
|---|---|---|---|
| 1066345 | 11/1979 | Canada | 310/328 |
| 502426 | 4/1976 | U.S.S.R. | 310/328 |

OTHER PUBLICATIONS

Punch Checking, by L. A. Stanton et al, *IBM Technical Disclosure Bulletin*, vol. 3, No. 3, Aug. 1980, p. 4.

*Primary Examiner*—Mark O. Budd
*Attorney, Agent, or Firm*—Morgan & Finnegan

[57] ABSTRACT

A displacement transmitting apparatus comprising a shaft hole which throttles by piezoelectric effect, and a shaft slidably inserted into the shaft hole engaged with a driving means which advances steppingly by mechanically amplified piezoelectric effect. On-off controlling of electric voltage for the displacement transmitting apparatus and the driving means causes the shaft to advance or conversely causes the driving means to advance where the shaft is fixed.

8 Claims, 6 Drawing Sheets

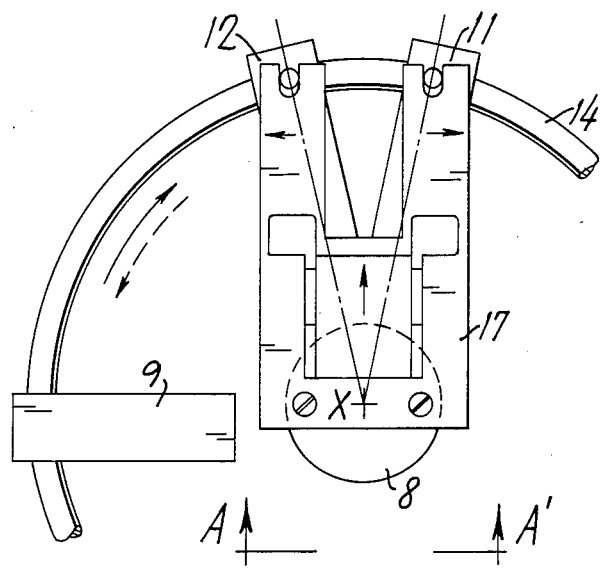
FIG. 8A
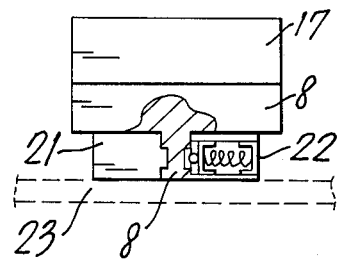
VIEW A-A'

PIEZOELECTRIC MOTOR

RELATED APPLICATIONS

This is a continuation-in-part application of copending application Ser. No. 770,669, filed Aug. 29, 1985, now abandoned.

The subject matter of this patent application is related to a second patent application, entitled "Piezelectric Actuator" by T. Shibuya, Ser. No. 770,665, filed Aug. 29, 1985, U.S. Pat. No. 4,647,808, issued Mar. 3, 1987.

BACKGROUND AND OBJECTS OF THE INVENTION

The present invention relates to an energy conversion apparatus which converts electric energy into mechanical energy utilizing the transverse effect of a laminated piezoelectric element.

Conventionally, stepping motors and solenoids are well known as actuators for electric control by way of electric signals. Since these controls are based on magnetic power, response time lag caused by inductance is generally unavoidable. In the case of a stepping motor, it generally cannot thus stop at a predetermined position due to its inertia and stops at an unstable position. In the case of a solenoid, since its energy conversion efficiency is very low, electric power consumption is high when it is operating at high speed, and due to the low efficiency, it overheats. To lengthen the life of the solenoid, its size may be enlarged. By doing so, it is improved somewhat, but its running cost, weight and volume are increased.

It is therefore an object of the invention to provide a motor that is simply constructed and easy to assemble due to a low number of component parts Another object of the invention is to provide an actuator or multipurpose motor that is economic and durable.

Another object of the invention is to provide a motor capable of moving in a straight or curved motion.

SUMMARY OF THE INVENTION

The present invention provides a piezoelectric motor comprising a shaft and a shaft holding member which absorbs vibrational energy when the shaft moves. The invention further provides displacement holding means. A displacement transmitting member throttles and releases the shaft. A driving section mechanically amplifies the displacement caused by the exited piezoelectric element and transfers the displacement to the shaft through the displacement transmitting member.

The piezoelectric motor is integrable on a holding plate making it comparable to conventional stepper motors.

Alternative configurations of the present invention include using a curved shaft to provide for curved motion. Alternatively, the shaft can be fixed providing for movement of the driving section.

BRIEF DESCRIPTION OF THE DRAWINGS

The invention will be described in greater detail below by way of reference to the following drawings, in which:

FIG. 8A is a top view of a third embodiment of the invention; and

DETAILED DESCRIPTION OF THE INVENTION

Figure 1:
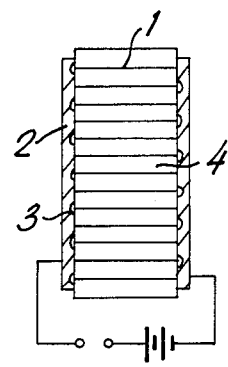
FIG. 1 is a general explanatory drawing of a laminated piezoelectric element.

Referring to FIG. 1, and internal electrode 1, an external electrode 2, an electric insulator 3, and a piezoelectric element 4 are shown. Since the displacement per single piezoelectric element is minimal, the elements are formed in a laminated construction and when electric voltage is applied to external electrode 2, the upper free end is displaced. Such a phenomena is widely known to those skilled in the art.

Figures 2A, 2B:
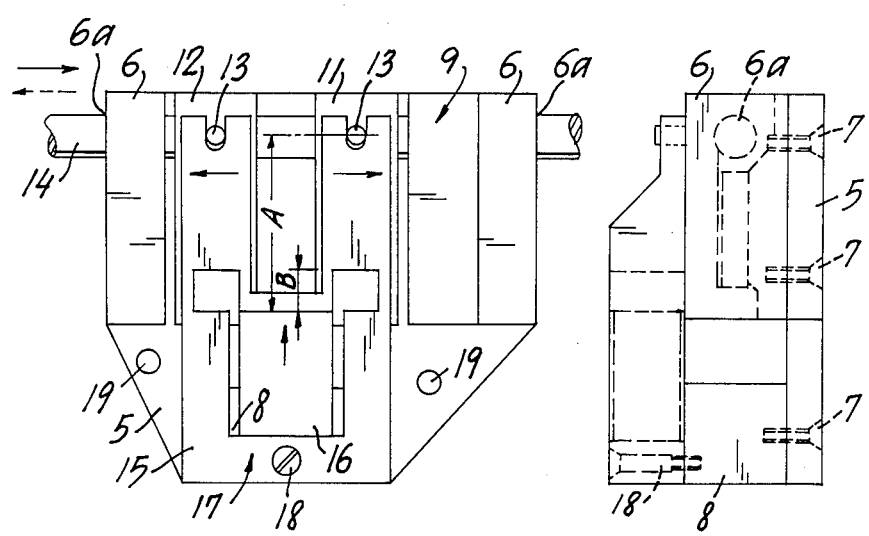
FIG. 2A is a top view illustration of a first embodiment of the invention.
FIG. 2B is a side view illustration of the first embodiment of the invention.

FIG. 2A shows a top view and FIG. 2B shows a side view of the preferred embodiment of the invention. Holding plate 5 is fixedly attached to bearing body 6 by a fastener such as screw 7. Bearing body 6 has a pair of bearing holes 6a. The center lower portion of a guide plate 8 is fixedly fastened to holding plate 5 by fastener 7. Shaft holding means 9 is shown and throttles shaft 14.

Figures 3A, 3B, 4A, 4B:
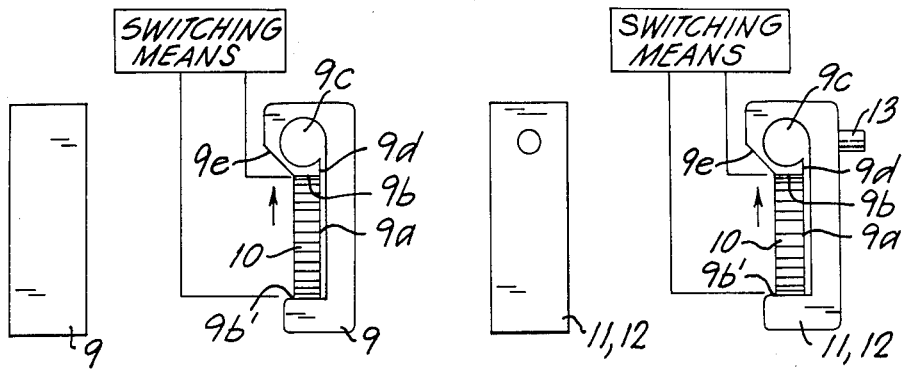
FIG. 3A is a top view illustration of the shaft holding apparatus.
FIG. 3B is a side view of the shaft holding apparatus.
FIG. 4A is a top view illustration of the displacement transmitting apparatus.
FIG. 4B is a side view of the displacement transmitting apparatus.

Referring to FIGS. 3A and 3B, shaft holding means 9 provides a recessed portion 9a surrounded by a channel shaped wall 9b. Into the recess portion 9a, the piezoelectric element 10 is fixedly attached with bonding by suitable bonding means, such as ARALDITE (tradename). At the upper side of the piezoelectric element 10, a bearing hole 9c is provided.

The piezoelectric element side of the bearing hole 9c is surrounded by a thin, arc-shaped wall 9e which provides a groove 9d, thus elastically surrounding the piezoelectric element 10 with thin wall 9e.

Referring again to FIGS. 2A and 2B, the shaft holding member 9 is fixedly attached to the bearing body 6 or to holding plate 5. As preferably embodied, the bearing hole 9c (FIG. 3B) and the bearing hole 6a of bearing body 6 (FIG. 2A) are coincided and fixedly attached by fastener 7.

Displacement transmitting members 11, 12 as shown in FIG. 2A and 2B are placed in parallel between shaft holding member 9 (FIG. 2A) and bearing body 6. Shaft 14 is slidably mounted in bearing holes 6a and 9c, respectively.

The major difference between the members of FIG. 4B and FIG. 3B is that in the displacement transmitting member of FIG. 4B, stopper pin 13 is projected at a right angle against the direction of the piezoelectric element 10. The other configurations and item numbers represent similar members between FIGS. 3B and 4B.

The bearing bodies 6, shaft holding member 9 and the first displacement transmitting members 11, 12 are preferably made of high strength steel. Further, the shaft holding member 9 and the inside of bearing hole 9c of displacement transmitting members 11, 12 may be treated to increase their frictional coefficient so as not to slip off when the shaft 14 is throttled and clamped. Base plate 15 may also be made of high strength steel.

Figures 5A, 5B:
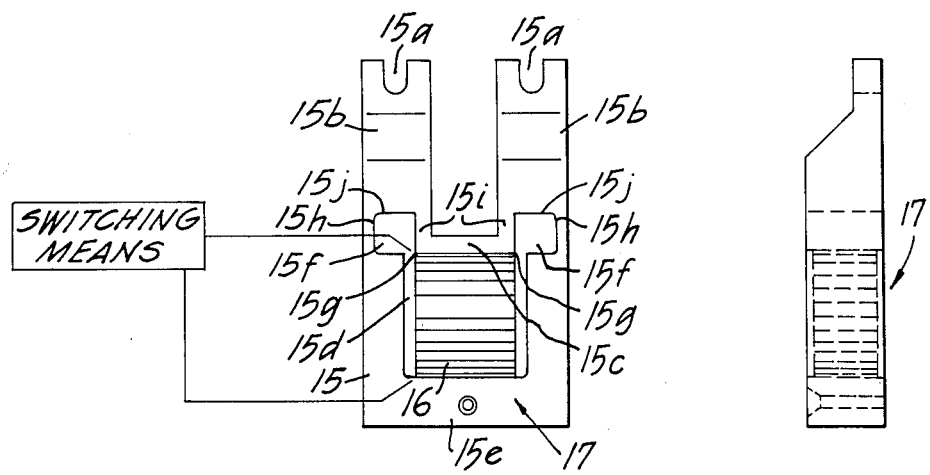
FIG. 5A is a front view of the driving section according to the first embodiment of the invention.
FIG. 5B is a side view of the driving section according to the first embodiment of the invention.

Referring to FIGS. 5A and 5B, a pair of thick projection bodies 15b are connected by a thin connecting wall 15c at its middle portion and each thick projection body 15b has an open groove 15a at its top portion. Under thin connecting wall 15c, rectangular-shaped tunnel 15d is provided. Along tunnel 15d, a U-shaped wall 15c is placed in a "U" and is connected to said projection body 15b. At both sides of the thin connecting wall 15c, which is located at the middle portion, a rectangular shaped hole 15f is provided at its bottom corner portion 15g. Thus, rectangular shaped tunnel 15f is connected to the rectangular shaped tunnel 15d. Under such construction, thin walls 15h and 15i are elastically formed at the bottom of the thick projection body 15b.

In the rectangular shaped hole 15d, piezoelectric element 16 is inserted and bonded with a bonding material such as ARALDITE (tradename). The piezoelectric element is shown surrounded by the inside of this connecting wall 15c and by the inside bottom U-shaped wall 15e and thus a driving device 17, including a base plate 15, are constructed.

Groove 15a is provided at the top portion of projection body 15b and is engaged with stopper pin 13 of displacement transmitting member 11, 12. Thus, the driving device 17 contacts with the flat surface of the displacement transmitting member and is fixed to guide plate 8 by screw 18 and is connected to holding plate 5. Item 19 denotes a fixing hole to fix the driving section 17.

Referring to FIG. 2A, when shaft 14 is to be moved in the direction of the upper solid line arrow, electric voltage is applied via switching means to the piezoelectric element 10 at the displacement transmitting member 11. Since the piezoelectric element 10 is solidly fixed by the wall 9b (FIGS. 3B, 4B), the piezoelectric element 10 pushes the arc-shaped wall 9e in the direction of the solid line arrows in FIGS. 3B and 4B responding to the applied voltage. Since the arc-shaped wall 9c is elastically formed, the arc-shaped wall 9e moves to the notched groove 9d side and throttles and fixes shaft 14.

In this case, if piezoelectric element 10 has a volume of $6 \times 16 \times 26$ mm³, the generating power of 29 kgf$\times$20um is gained (20 um displacement). When electric voltage is applied via switching means to the piezoelectric 16 (FIG. 5A) of driving section 17, since the piezoelectric element 16 is fixed on lower inside surface of wall 15c of base plate 15, the piezoelectric element 16 Pushes the inside wall of the thin connecting wall 15c of the base plate 15 responding to the applied voltage in the direction of the arrow.

In addition, by providing rectangular shaped hole 15f, a pair of projection bodies 15b, located on base plate 15, move in the direction of the pair of arrows (FIG. 2A) keeping upper edge 15j of the rectangular shaped hole 15f as the base line or zero point. Thin walls 15h and 15i are elastically formed to cause the above described movement of the projection body 15b.

As groove 15a provided in projection body 15b is engaging with stopper pin 13 (FIG. 4B) provided at the displacement transmitting member 12, shaft 14 moves in the direction of the upper solid line arrow by displacement transmitting member 11. Since the displacement transmitting member 12 and the shaft 14 are in a released condition, the displacement of the shaft 14 is not related to the displacement transmitting member 12.

In this case, if the piezoelectric element 16 of driving section 17 has a volume of $20 \times 15 \times 26$ mm³, a generated power of 66 kgf$\times$20 um (um=$10^{-6}$m) is gained. (20 um displacement.) Accordingly, the displacement D near stopper pin 13 of displacement transmitting member 11 is expressed as $D = k \times A/B$, where k denotes the displacement by the piezoelectric element 16 of driving section 17, and A and B denote distances as shown in FIG. 2. For example, if the distance A is 35 mm and the distance B is 7 mm, the displacement D is expressed as $D = 20 \text{ um} \times 35/7 = 100$ um. As this calculation shows, the displacement D at piezoelectric element 16 of driving section 17 is expressed by multiplying the ratio of arm length A/B as shown in FIG. 2A.

Accordingly, the driving section 17 comprising piezoelectric element 16 and base plate 15 are constituted as a mechanical amplifying section on base plate 15.

As the next step, after applying voltage to driving section 17, if the displacement transmitting member 11 is turned off and simultaneously the piezoelectric element 10 at shaft holding member 9 is turned on, the generating power of driving section 17 and the throttling between displacement transmitting member 11 and shaft 14 are released and resume their ordinary position. Thus, shaft holding member 9 and shaft 14 are throttled. This is because displacement transmitting member 11 actuates shaft holding member 9 just after the displacement transmitting member 11 is displaced. The shaft holding member 9 absorbs the vibrating energy of the shaft 14 and keeps the displacement in the direction of the upper solid line arrow.

Figure 6A:
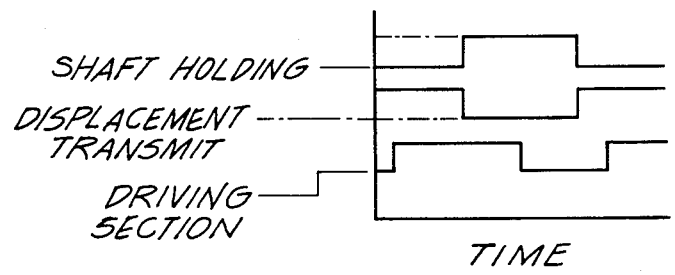
FIG. 6A and 6B illustrate the cycle time relation according to the first embodiment of the invention.
Figure 6B:
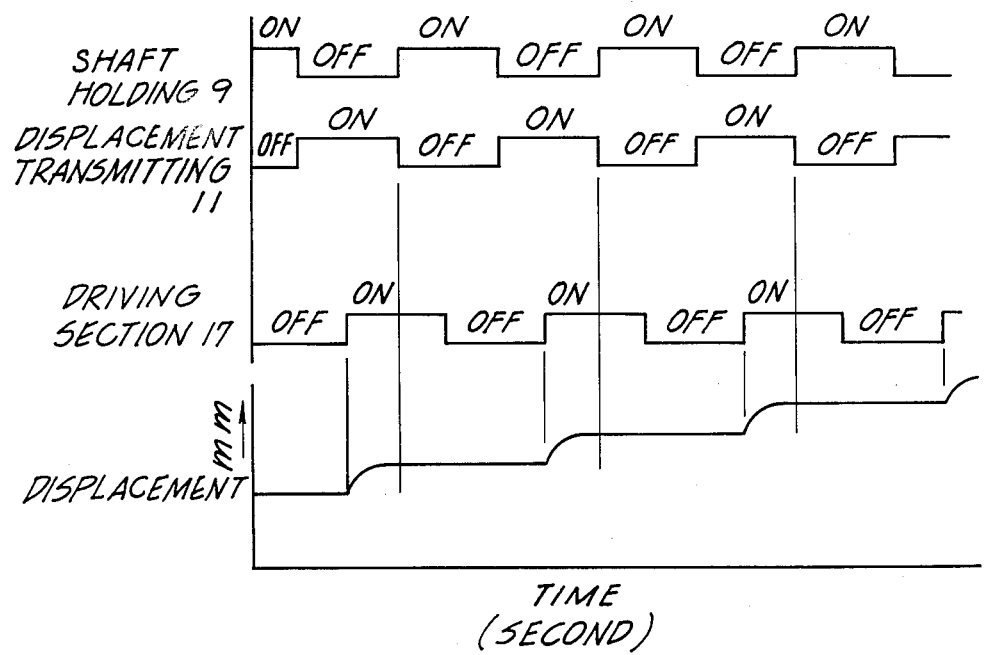

FIGS. 6A and 6B illustrate the cycle time for the above-described functional motion. When the shaft 14 is to be moved in the direction of the dotted arrow (FIG. 2A), first the throttling action between the shaft holding member 9 and shaft 14 is released and the piezoelectric element 10 of the displacement transmitting member 12 is energized to throttle the displacement transmitting member and shaft 14. Next, the piezoelectric element 16 of the driving section 17 is simultaneously energized moving the shaft 14 in the direction of the dotted line as described above.

The inside surfaces of the shaft holding member 9, the bearing hole 9c of shaft holding member 9, and displacement transmitting member 11, 12 are important considerations so far as their friction coefficient in relation to the throttling action with shaft 14 are concerned. The inside of bearing hole 9c is treated to increase its friction coefficient so as not to slip off. Thereby the displacement action is secured and its durability improved.

Thus, according to the instant invention, vibrating movement is converted into linear movement. Displacement member 11 is throttled by piezoelectric expansion and grasps shaft 14. The displacement transmitting member 11 is then moved rightward by piezoelectric expansion at driving section 17. Accordingly, the vibratory (on-off) piezoelectric action action at piezoelectric element 16 and piezoelectric element 10 will cause the shaft 14 to move rightward.

Additionally, to make the above-described motion more stable, shaft holding member 9 is provided. The on-off action of shaft holding member 9 is arranged to be the reverse of the on-off action of the displacement transmitting member 11. Shaft holding member 9 is effective to absorb the vibration of shaft 14 and to protect against shaft 14 retracting when displacement transmitting member 11 resumes its original position (voltage to piezoelectric element 16 being released).

Figure 7:
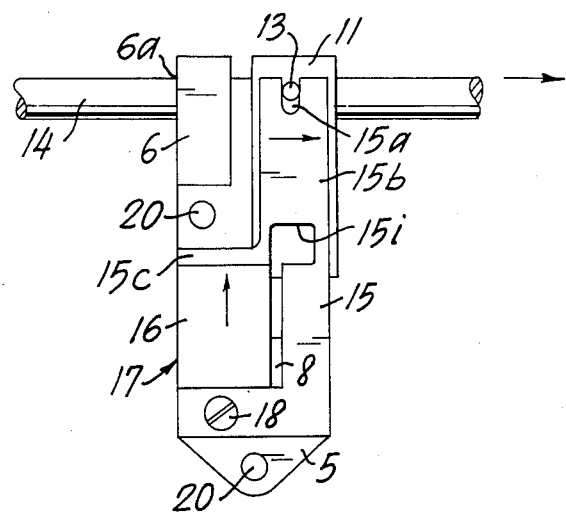
FIG. 7 is a top view of a second embodiment of the invention.

FIG. 7 illustrates a second embodiment of the invention differing from the first embodiment of FIG. 2A and FIG. 2B in that the second embodiment comprises a single driving section 17 consisting of base plate 15 which comprises a displacement transmitting member 11, a bearing body 6 and project body 15b. The driving section of the second embodiment is designed to drive shaft section 14 constantly in the direction of the arrow in FIG. 7 (i.e., to the right in FIG. 7).

At the upper flat portion of the holding plate 5, bearing body 6 has bearing hole 6a provided. At the center portion of the lower part of the holding plate 5, a guide plate 8 is provided and both bearing body 6 and guide plate 8 are secured by fasteners such as screws. Item 11 denotes a displacement transmitting member and corresponds to item 11 of FIG. 4. Shaft 14 is slidably inserted into bearing holes 6a and 9c in the direction of the shaft axis. Driving section 17 includes a piezoelectric element 16 and base plate 15. Base plate 15 provides groove 15a, projection body 15b, and a thin wall 15c which is arranged at the center portion.

In driving section 17, a groove 15a located at the top of the projection body 15b engages with a stopper pin 13 located at the displacement transmitting member 11. Driving section 17 is placed on a plain surface of the displacement transmitting member 11 and is fixedly attached to guide plate 8 with fasteners connecting it with holding plate 5. Holes 20 are used for installation. Other functions of the second embodiment are substantially the same as in the first embodiment.

Referring to the operation of the second embodiment, when the shaft 14 is to be move, voltage is applied to the piezoelectric element 10 which pushes the thin arc-shaped wall 15c responding to the applied voltage and thereby throttles shaft 14 (see FIG. 4). Next, voltage is applied to piezoelectric element 16 of the driving section 17. Piezoelectric element 16 then pushes the inside surface of the thin wall 15c of base plate 15, responding to the applied voltage, thus moving projection body 15b in the direction of the arrow of FIG. 7, thus setting the upper edge 15; as the base plane. Accordingly, as groove 15a of the base plate 15 engages with the stopper pin 13 of the displacement transmitting member 11, shaft 14 moves in the direction of the arrow in FIG. 7.

When the displacement transmitting member 11 and the driving section 17 are deenergized, the throttling action between the shaft 14, the displacement transmitting member 11 and the driving power at driving section 17 are released.

The method of driving the shaft 14 to the left is derived by rearranging the functional parts in opposite positions referring to the above-described method and apparatus of the second embodiment and as such its details are omitted.

Figure 8B:
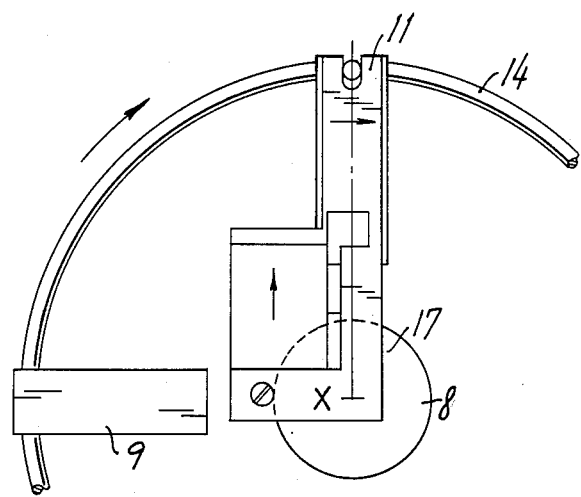
FIG. 8B is a top view of the third embodiment of the invention.

FIGS. 8A and 8B illustrate a third embodiment which is a variation of the first and second embodiments. Both drawings are top views. Referring to FIG. 8A, the arc or circular shaped shaft 14 is inserted into the displacement transmitting members 11, 12 and into the bearing hole 9c of the shaft holding member 9. Shaft 14 moves reciprocally through displacement transmitting members 11, 12 and shaft holding member 9. Driving section 17 may be fastened to guide plate 8. At the bottom of the guide plate 8, projection 8a is provided and is rotably inserted into the center hole of receiving body 21.

In this case, projection 8a coincides with center point X which is the center of driving section 17. At the receiving body 21, a holding device 22 is provided which protects against the receiving body 8 slipping off. The shaft holding member 9 and the receiving body 21 may be fixed to the base plate 23 which is identified by dotted lines. By so doing, the combined action between displacement transmitting members 11, 12, the shaft holding member 9 and driving section 17 causes the shaft 14 to move in the axial direction intermittently, keeping projection 8a as a center point. As FIG. 8A shows, shaft 14 moves in two directions as both the solid and dotted line arrows indicate.

Referring to FIG. 8B in this embodiment, the combined action between the displacement transmitting member 11, the shaft holding member 9 and the driving section 17 causes the shaft 14 to move intermittently in a clockwise direction, as shown by the arrow, keeping the projection 8a as the center. Otherwise, the construction and action of the embodiment of FIG. 8B is the same as the embodiment of FIG. 8A, so further explanation thereof is unnecessary. Thus, according to the instant invention vibratory movement may be converted directly to rotational movement.

Depending upon the functional relation or intended use with the driven section, not shown, elimination of one or a pair of the bearing bodies 6, or utilization of shaft holding member 9, a wide variety of curved motions combining linear motion and circumferential motion are within the spirit and scope of the present invention.

In the aforementioned embodiments, the mechanism of moving the shaft 14 in a straight or curved motion employing a displacement transmitting member 11, 12 while keeping the driving section 17 fixed is explained. Conversely, it is possible to move the driving section 17 in a straight or curved motion through displacement transmitting member 11, 12 by keeping the shaft 14 fixed.

The terms and expressions which have been employed are used as terms of description and not of limitation and there is no intention in the use of such terms and expressions of excluding any equivalents of the features shown and described, or portions thereof, and it is recognized that various modifications are possible within the scope of the invention claimed.

What is claimed:

1. A piezoelectric motor, comprising:
    a shaft;
    displacement transmitting means, including
        a first piezoelectric element,
        a shaft holding member having a bearing hole therein for throttling and releasing the shaft in response to displacement of the first piezoelectric element, and a stopper pin;
    driving means, including
        a base plate,
        a second piezoelectric element fixed to the base plate,
        projection means fixed to the base plate and adapted to engage with the stopper pin and mechanically amplify the displacement of the second piezoelectric element;

means for intermittently applying electric voltage to the first and second piezoelectric elements there effecting movement of the shaft.

2. An apparatus as recited in claim 1, wherein said shaft is curved.

3. An apparatus as recited in claim 1, wherein said shaft is fixed and said driving section moves.

4. An apparatus as recited in claim 2, wherein said shaft is fixed and said driving section moves.

5. An apparatus as recited in claim 1, wherein wherein said displacement transmitting means and said driving means are fixedly attached to a holding plate.

6. An apparatus as recited in claim 5, wherein said shaft is curved.

7. An apparatus as recited in claim 5, wherein said shaft is fixed and said driving section moves.

8. An apparatus as recited in claim 6, wherein said shaft is fixed and said driving section moves.

* * * * *